(12) United States Patent
Pickett et al.

(10) Patent No.: US 7,960,031 B2
(45) Date of Patent: Jun. 14, 2011

(54) COATED SHEET, METHOD OF FORMATION THEREOF, AND ARTICLES DERIVED THEREFROM

(75) Inventors: James Edward Pickett, Schenectady, NY (US); James Norman Cawse, Pittsfield, MA (US); Gert Boven, Steenbergen (NL); Gregory Ronald Gillette, Clifton Park, NY (US); Paul Sigston, Bergon op Zoom (NL); Mao Chen, Appleton, WI (US); Gautam Ambalal Patel, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 690 days.

(21) Appl. No.: 10/882,530

(22) Filed: Jun. 30, 2004

(65) Prior Publication Data

US 2006/0003164 A1 Jan. 5, 2006

(51) Int. Cl.
*B32B 27/08* (2006.01)
*B32B 27/34* (2006.01)

(52) U.S. Cl. ........ 428/480; 428/412; 428/501; 428/502; 428/524; 427/160

(58) Field of Classification Search .................. 428/412, 428/480, 524

See application file for complete search history.

(56) References Cited

U.S. PATENT DOCUMENTS

| | | | |
|---|---|---|---|
| 2,999,835 A | 9/1961 | Goldberg | |
| 3,153,008 A | 10/1964 | Fox | |
| 3,334,154 A | 8/1967 | Kim | |
| 4,001,184 A | 1/1977 | Scott | |
| 4,123,436 A | 10/1978 | Holubet et al. | |
| 4,131,575 A | 12/1978 | Adelmann et al. | |
| 4,197,392 A | 4/1980 | Moore | |
| 4,216,298 A | 8/1980 | Schreckenberg et al. | |
| 4,552,936 A | 11/1985 | Moore | |
| 4,554,309 A * | 11/1985 | Mark et al. ............... | 524/611 |
| 4,561,162 A * | 12/1985 | Brockway et al. ........... | 29/428 |
| 4,598,021 A | 7/1986 | Moore | |
| 4,714,647 A | 12/1987 | Shipp, Jr. et al. ........... | 428/212 |
| 4,714,657 A | 12/1987 | Quinn et al. | |
| 4,740,780 A * | 4/1988 | Brown et al. ............. | 345/7 |
| 4,816,529 A | 3/1989 | Harris | |
| 4,913,874 A | 4/1990 | Pinchuk et al. ........... | 264/564 |
| 4,913,974 A | 4/1990 | Moore et al. | |
| 4,960,826 A | 10/1990 | Walisser | |
| 4,990,376 A | 2/1991 | Patel | |
| 5,034,458 A | 7/1991 | Serini et al. | |
| 5,212,229 A * | 5/1993 | Taylor et al. ............. | 524/556 |
| 5,621,052 A | 4/1997 | Szita et al. | |
| 5,654,380 A * | 8/1997 | Kawai et al. ............. | 525/439 |
| 5,714,530 A | 2/1998 | Waterman | |
| 5,760,228 A | 6/1998 | Waterman | |
| 5,770,115 A * | 6/1998 | Misura .................... | 252/586 |
| 5,830,305 A | 11/1998 | Andersen et al. | |
| 5,869,554 A | 2/1999 | Pickett et al. | |
| 5,929,193 A | 7/1999 | Greco | |
| 5,965,670 A * | 10/1999 | Mauer et al. ............. | 525/398 |
| 6,297,314 B1 | 10/2001 | Hintze-Bruning et al. ... | 524/589 |
| 6,506,488 B1 * | 1/2003 | Stewart et al. ............ | 428/332 |
| 2003/0224623 A1 | 12/2003 | Takahashi | |

FOREIGN PATENT DOCUMENTS

| | | |
|---|---|---|
| EP | 0483488 A1 | 9/1991 |
| JP | 2000296579 A | 10/2000 |
| JP | 2003311908 A | 11/2003 |
| WO | 88/00218 A1 | 1/1988 |
| WO | WO 98/27146 | 6/1998 |

OTHER PUBLICATIONS

International Search Report for International Application No. PCT/US2005/022949, mailed Dec. 10, 2005.
Wikipedia Entry for Triazine; http://en.wikipedia.org/w/index.php?title=Triazine&printable=yes; Jan. 27, 2007; 2 pages.
Oligomeric, as defined by the New Oxford American Dictionary, 2005, Oxford University Press, p. 1186.
Desmophen VP LS 2391 Technical Data Sheet; Edition: Mar. 28, 2003; 2 pages.
ANSI/SAE Z26.1-1996 Excerpts; Approved by ANSI Aug. 11, 1997; 7 pages.
U.S. Appl. No. 11/874,700, filed Oct. 18, 2007; Non-Final Office Action; 7 pages.
U.S. Appl. No. 11/874,700, filed Oct. 18, 2007; Final Office Action; 10 pages.
U.S. Appl. No. 11/874,700, filed Oct. 18, 2007; Notice of Allowance; 17 pages.
David R. Bauer, "Predicting In-Service Weatherability of Automotive Coatings: A New Approach," Journal of Coatings Technology, vol. 69, No. 864, Jan. 1987, pp. 85-96.
J. E. Pickett, "Permanence of UV Absorbers in Plastics and Coatings," Handbook of Polymer Degradation, 2nd edition, Marcel Dekker (2000), pp. 163-190.
R. Iyengar and B. Schellenberg, "Loss Rate of UV Absorbers in Automotive Coatings," Polymer Degradation and Stability, 61 (1998) pp. 151-159.
Plastics Additives Handbook, 5th edition, H. Zweifel ed., Hanser Publishers (2001), pp. 123-136.
ASTM D 1925-70 Standard Test Method for Yellowness Index of Plastics (3 pages).
ASTM D 1003-00 Standard Test Method for Haze and Luminous Transmittance of Transparent Plastics (6 pages).
ASTM D 1044-99 Standard Test Method for Resistance of Transparent Plastics to Surface Abrasion (5 pages).
Written Opinion of the International Searching Authority; International Application No. PCT/US2005/022949; International Filing Date Jun. 28, 2005; 5 pages.

* cited by examiner

*Primary Examiner* — James Seidleck
*Assistant Examiner* — Saira Haider
(74) *Attorney, Agent, or Firm* — Cantor Colburn LLP

(57) ABSTRACT

A sheet material includes a polycarbonate substrate and a protective coating containing the reaction products of an aminoplast resin, a polyol compound, and a UV-absorbing amount of a triazine compound. The sheet material exhibits an improved balance of abrasion resistance, solvent resistance, weatherability, and formability.

25 Claims, No Drawings

COATED SHEET, METHOD OF FORMATION THEREOF, AND ARTICLES DERIVED THEREFROM

BACKGROUND OF THE INVENTION

Protective coatings containing the curing products of aminoplast resins and polyvalent alcohols are known to improve the abrasion resistance and solvent resistance of thermoplastic substrates. For example, U.S. Pat. No. 4,552,936 to Moore generally describes a protective coating composition containing a polycaprolactone polyol and an aminoplast derivative. As another example, U.S. Pat. No. 4,714,657 to Quinn et al. describes protective coatings derived from polyester polyols and aminoplast derivatives. Another example is provided by U.S. Pat. No. 4,913,974 to Moore et al., which describes coated articles comprising a thermoplastic substrate and a surface coating that is the reaction product of a melamine compound, a polyol, and a multimeric benzotriazole compound. Increasingly demanding product applications have created a need for coated thermoplastic sheets with an improved balance of abrasion resistance, solvent resistance, weatherability, and formability.

BRIEF DESCRIPTION OF THE INVENTION

An improved balance of abrasion resistance, solvent resistance, weatherability, and formability is provided by a sheet, comprising: a first layer comprising a polycarbonate resin; and a second layer disposed on a surface of the first layer, the second layer comprising a cured product obtained on curing a curable composition comprising an aminoplast resin, a polyol compound, and a UV-absorbing amount of a triazine compound.

Other embodiments, including a method of producing the sheet, and an article derived from the sheet, are described in detail below.

DETAILED DESCRIPTION OF THE INVENTION

The present inventors have conducted extensive research into improving the properties of polycarbonate sheet with protective coatings. It is known that a key factor in determining the weathering lifetime of a coating is the stability of the ultraviolet light absorber ("UV absorber") within the coating. See, for example, D. R. Bauer, *Journal of Coatings Technology*, vol. 69, pp. 85-95 (1997); and J. E. Pickett in "Handbook of Polymer Degradation, $2^{nd}$ Edition," S. H. Hamid, ed., Marcel Dekker (2000) pp. 163-190. However, the kinetics of UV absorber loss through photolysis were shown to be dependent on the structure of the UV absorber and on the matrix, and the performance of a particular absorber in a particular coating could not be accurately predicted a priori. The literature also indicates that although triazine UV absorbers may be about 30% more stable than benzotriazole UV absorbers in some protective coatings, they may be as much as 2.5 times less stable in others.

The present inventors were therefore surprised to discover that aminoplast/polyol protective coatings containing triazine-based UV absorbers show substantially superior light stability compared to corresponding coatings with benzotriazole- or benzophenone-based UV absorbers. Also surprising was the unexpected improvement in the formability of the sheets with protective coatings containing triazine-based UV absorbers without loss of abrasion resistance. The UV absorber constitutes such a small percentage of the protective coating composition that it was not expected to have any significant effect on formability. In addition, the protective coatings containing triazine-based UV absorbers unexpectedly exhibit improved coating adhesion.

Thus, one embodiment is a sheet, comprising: a first layer comprising a polycarbonate resin; and a second layer disposed on a surface of the first layer, the second layer comprising a cured product obtained on curing a curable composition comprising an aminoplast resin, a polyol compound, and a UV-absorbing amount of a triazine compound.

The sheet comprises a first layer comprising a polycarbonate resin. Suitable polycarbonates may be prepared by reacting a dihydric phenol with a carbonate precursor, such as phosgene, a haloformate, or a carbonate ester. Generally, such carbonate polymers comprise recurring structural units of the formula

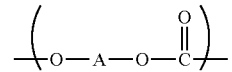

wherein A is a divalent aromatic radical of the dihydric phenol employed in the polymer producing reaction. In one embodiment, the polycarbonate may have an intrinsic viscosity (as measured in methylene chloride at 25° C.) of about 0.30 to about 1.00 deciliter/gram (dL/g). The dihydric phenols employed to provide such polycarbonates may be mononuclear or polynuclear aromatic compounds, containing as functional groups two hydroxy radicals, each of which is attached directly to a carbon atom of an aromatic nucleus. Suitable dihydric phenols include, for example, 2,2-bis(4-hydroxyphenyl)propane (bisphenol A), hydroquinone, resorcinol, 2,2-bis(4-hydroxyphenyl)pentane, 2,4'-(dihydroxydiphenyl)methane, bis(2-hydroxyphenyl)methane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxydiphenyl)sulfone, bis (3,5-diethyl-4-hydroxyphenyl)sulfone, 2,2-bis(3,5-dimethyl-4-hydroxyphenyl)propane, 2,4'-dihydroxydiphenyl sulfone, 5'-chloro-2,4'-dihydroxydiphenyl sulfone, bis(4-hydroxyphenyl)diphenyl sulfone, 4,4'-dihydroxydiphenyl ether, 4,4'-dihydroxy-3,3'-dichlorodiphenyl ether, 4,4-dihydroxy-2,5-dihydroxydiphenyl ether, and the like, and mixtures thereof. Other dihydric phenols suitable for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

The polycarbonate resins can be manufactured by known processes, such as, for example and as mentioned above, by reacting a dihydric phenol with a carbonate precursor, such as phosgene, a haloformate, or a carbonate ester, in accordance with methods set forth in the above-cited literature and in U.S. Pat. No. 4,123,436 to Holub et al., or by transesterification processes such as are disclosed in U.S. Pat. No. 3,153,008 to Fox, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized blends of linear polycarbonate and a branched polycarbonate. Moreover, blends of any of the above materials may be employed in the practice of this invention to provide the polycarbonate resin.

The polycarbonates may be branched or linear and generally will have a weight average molecular weight of about 10,000 to about 200,000 atomic mass units (AMU), specifically from about 20,000 to about 100,000 AMU as measured by gel permeation chromatography. The polycarbonates of the invention can employ a variety of end groups to improve performance. Bulky mono phenols, such as cumyl phenol, are preferred.

Suitable polycarbonates further include those derived from bisphenols containing alkyl cyclohexane units. Such polycarbonates have structural units corresponding to the structure

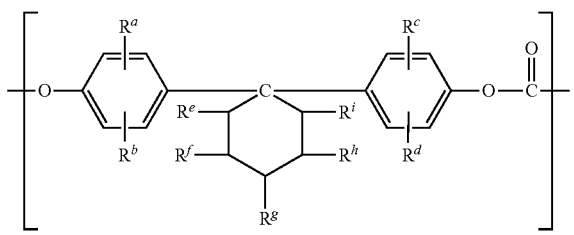

wherein $R^a$—$R^d$ are each independently hydrogen, $C_1$-$C_{12}$ hydrocarbyl, or halogen; and $R^e$—$R^i$ are each independently hydrogen, $C_1$-$C_{12}$ hydrocarbyl. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl or hydrocarbylene residue may also contain carbonyl groups, amino groups, hydroxyl groups, or the like, or it may contain heteroatoms within the backbone of the hydrocarbyl residue. Alkyl cyclohexane containing bisphenols, for example the reaction product of two moles of a phenol with one mole of a hydrogenated isophorone, are useful for making polycarbonate resins with high glass transition temperatures and high heat distortion temperatures. Such isophorone bisphenol-containing polycarbonates have structural units corresponding to the structure

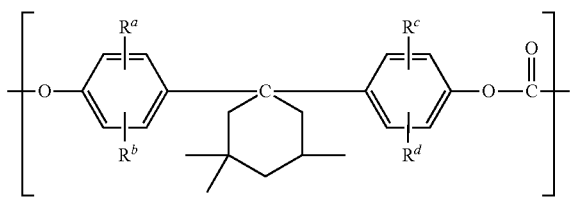

wherein $R^a$—$R^d$ are as defined above. These isophorone bisphenol based resins, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name and described, for example, in U.S. Pat. No. 5,034,458 to Serini et al.

The first layer may be substantially transparent, translucent, or opaque. In one embodiment, the first layer comprises at least about 80 weight percent polycarbonate, specifically at least about 90 weight percent polycarbonate, more specifically at least about 95 weight percent polycarbonate.

In addition to polycarbonate, the first layer may, optionally, comprise an additional thermoplastic resin such as, for example, poly(butylene terephthalate), poly(ethylene terephthalate), aliphatic polyesters, poly(styrene-co-acrylonitrile), rubber-containing impact modifiers, or the like, separately or in combinations. The first layer may, optionally, further comprise UV stabilizers, heat stabilizers, and the like, which are typically present at less than 1 weight percent when used.

In one embodiment, the first layer is substantially free of colorant. In other words, the first layer contains less than 0.1 weight percent colorant. It may be preferred that no intentionally added colorant be used. In another embodiment, the first layer comprises a colorant in an amount up to about 20 weight percent, specifically up to about 5 weight percent. The term "colorant" includes dyes and pigments and any other substances added to affect the hue or increase the opacity of the first layer.

In one embodiment, the first layer has a thickness of about 0.05 to about 25 millimeters. Within this range, the thickness may be at least about 0.1 millimeters, more specifically at least about 0.2 millimeters. Also within this range, the thickness may be up to about 20 millimeters, more specifically up to about 13 millimeters.

The sheet comprises a second layer disposed on a surface of the first layer. The second layer comprises a cured product obtained on curing a curable composition comprising an aminoplast resin, a polyol compound, and a UV-absorbing amount of a triazine compound.

The aminoplast resin is the reaction product of an amine and an aldehyde, optionally in combination with an alcohol. Suitable amines used to prepare the aminoplast resin include, for example, urea, melamine, triazines, diazines, triazoles, guanidines, guanamines, and the like, as well as alkyl- and aryl-substituted derivatives of the foregoing amines. Suitable aldehydes used to form the aminoplast resin include, for example, formaldehyde, acetaldehyde, crotonaldehyde, acrolein, benzaldehyde, furfural, and the like. The aminoplasts contain methylol or similar alkylol groups, depending on the structure of the aldehyde used. In one embodiment, at least a portion of the alkylol groups is etherified by reaction with a monohydric alcohol. Suitable monohydric alcohols include, for example, $C_1$-$C_8$ aliphatic alcohols such as, for example, ethanol, propanol, butanol, cyclohexanol, and the like. Suitable monohydric alcohols further include alcohols containing aromatic groups, such as benzyl alcohol, and halogen-substituted alcohols such as 3-chloropropanol. Suitable monohydric alcohols further include any additional alcohols described below as solvents for the curable composition.

In one embodiment, the aminoplast is the reaction product of melamine, formaldehyde, and an alcohol, wherein the reaction product has the formula

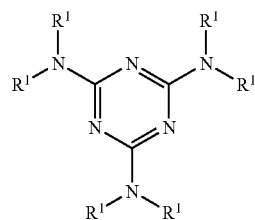

wherein each occurrence of $R^1$ is independently hydrogen, a methylene bridge to another melamine nucleus, or $CH_2OR^2$, wherein $R^2$ is hydrogen or $C_1$-$C_{12}$ alkyl. In particular, $R^2$ may be methyl. In one embodiment, at least 4, at least 5, or all 6 $R^1$ groups may be methoxymethyl.

Suitable aminoplast resins include the urea-formaldehyde resins available from Cytec as CYMEL® U-60, U-64, U-65, and U-382, and the melamine-formaldehyde resins available from Cytec as CYMEL® 300, 301, 303, 322, 350, and 3717.

The coating composition may comprise curable solids and volatile solvents. Thus, the composition may comprise about 20 to about 80 weight percent of the aminoplast resin, based on the total weight of the curable solids. Within this range, the aminoplast resin amount may specifically at least about 30 weight percent, more specifically at least about 40 weight percent. Also within this range, the aminoplast resin amount may specifically up to about 70 weight percent, more specifically up to about 60 weight percent.

The curable solids may be diluted with solvents. Based on total coating weight (the sum of curable solids and solvents), the weight of curable solids ranges from about 1 to about 99 weight percent. Within this range, the curable solids amount may specifically at least about 10 weight percent, more specifically at least about 20 weight percent. Also within this range, the curable solids amount may specifically up to about 80 weight percent, more specifically up to about 60 weight percent.

In addition to the aminoplast resin, the curable composition used to form the second layer comprises a polyol compound. The polyol compound is an organic compound containing at least two hydroxy groups. In one embodiment, the polyol compound may have the structure

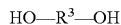

HO—$R^3$—OH wherein $R^3$ is $C_2$-$C_{24}$ hydrocarbylene, optionally substituted with one or more heteroatoms. Suitable polyol compounds include dihydric phenols, such as, for example, resorcinol, 2,2'-methylenediphenol, 2,4'-methylenediphenol, 4,4'-methylenediphenol, 4,4'-isopropylidenediphenol, 4,4'-dihydroxydiphenylsulfone, and the like; dihydric aliphatic alcohols such as, for example, ethylene glycol, diethylene glycol, triethylene glycol, tetraethylene glycol, propylene glycol, 1,3-propanediol, 1,4-butanediol, 1,5-penatnediol, 1,2,3-propanetriaol, pentaerythritol, sorbitol, and the like; alkyd resins, such as hydroxy-functional epoxy resins; soluble cellulose derivatives; vinyl polymers with free hydroxyl groups such as homopolymers and copolymers of vinyl alcohol, and partial hydrolysates of homopolymers and copolymers of vinyl acetate; oligomeric aliphatic polyester diols; oligomeric aliphatic polycarbonate diols; oligomeric aliphatic polyester-carbonate diols; oligomeric aliphatic polyurethane diols; and the like; and mixtures of the foregoing polyol compounds. In one embodiment, the polyol compound may contain carboxyl or amino groups in addition to the hydroxy groups.

In one embodiment, the polyol compound comprises an oligomeric aliphatic polyester diol. The oligomeric aliphatic polyester diol may be the reaction product of a diacid and a diol, wherein the diacid comprises at least 50% by number aliphatic diacids in which the two acid groups are separated by at least two, preferably at least four, intervening carbon atoms, and the diol comprises at least 50% by number aliphatic diols in which the two hydroxyl groups are separated by at least two, preferably at least four, intervening carbon atoms. Suitable aliphatic diacids include, for example, succinic acid, glutaric acid, adipic acid, suberic acid, sebacic acid, azelaic acid, 1,12-dodecanedioic acid, 2,2,4- and 2,4,4-trimethyl-1,6-hexanedioic acid, and mixtures thereof. Suitable for use as the remaining diacids are, for example, unsaturated dicarboxylic acids such as maleic acid, fumaric acid, itaconic acid, citraconic acid, and the like; cycloaliphatic diacids and anhydrides such as 1,2-cyclohexanedicarboxylic anhydride, tetrahydrophthalic anhydride, 1,3-cyclohexanedicarboxylic acid, 1,4-cyclohexanedicarboxylic acid, and the like; aromatic diacids such as phthalic acid, isophthalic acid, terephthalic acid, and the like; and mixtures thereof. Suitable for use as the aliphatic diols are those having the structure

HO—$(CH_2)_n$—OH wherein n is 4 to about 12, and $C_1$-$C_6$ hydrocarbyl-substituted derivatives thereof. Specific aliphatic diols include, for example, 1,6-hexanediol, 3-methyl-1,5-pentanediol, 2,2,4-trimethyl-1,5-pentanediol, and the like. Suitable for use as the remaining diol are, for example, short chain aliphatic diols such as 1,3-butanediol, 1,3-propylene glycol, 2,2-diethyl-1,3-propanediol, ethylene glycol, neopentyl glycol, and the like; cycloaliphatic diols such as 4,4'-methylenebis(cyclohexanol), 4,4'-isopropylidenebis(cyclohexanol), cyclohexanedimethanols, and the like; aromatic diols such as phenylenedipropanols, and the like; and mixtures thereof. In one embodiment, the oligomeric aliphatic polyester diol is a reaction product of an aliphatic diacid in which the two acid groups are separated by at least four, intervening carbon atoms, and an aliphatic diols in which the two hydroxyl groups are separate by at least four intervening carbon atoms. The oligomeric aliphatic polyester diol may also be synthesized by the reaction of an aliphatic lactone, such as caprolactone, with an aliphatic diol. In one embodiment, the oligomeric aliphatic polyester diol has a number average molecular weight of about 200 to about 4,000 AMU. Within this range, the molecular weight may specifically be at least about 500 AMU. Also within this range, the molecular weight may specifically be up to about 3,000 AMU, more specifically up to about 2,500 AMU. Suitable techniques for preparing the oligomeric polyester diols include those known in the art for preparation of polyesters, generally. Suitable oligomeric aliphatic polyester diols are commercially available as, for example, DESMOPHEN® S1015-120 from Bayer (formerly sold as RUCOFLEX® S1015-120), and Tone 210 from Dow.

In one embodiment, the polyol compound comprises an oligomeric aliphatic polycarbonate diol. An oligomeric aliphatic polycarbonate diol is a reaction product of a diol, as described above for the oligomeric aliphatic polyester diol, and a carbonate precursor. As for the synthesis of polycarbonate, described above, the carbonate precursor may include phosgene, a haloformate, or a carbonate ester. Suitable diols are the same as those described above for the oligomeric aliphatic polyester diol. In one embodiment, the oligomeric aliphatic polycarbonate diol has a number average molecular weight of about 200 AMU to about 4,000 AMU. Within this range, the molecular weight may specifically be at least about 400 AMU, more specifically at least about 800 AMU. Also within this range, the molecular weight may specifically be up to about 3,000 AMU, more specifically up to about 2,500 AMU. Suitable techniques for preparing the oligomeric polycarbonate diols include those known in the art for preparation of polycarbonates, generally.

In one embodiment, the polyol compound comprises an oligomeric aliphatic polyestercarbonate diol. Such compounds are essentially hybrids of the oligomeric aliphatic polyester diols and oligomeric aliphatic polycarbonate diols described above, in that they contain two terminal hydroxy groups and internal carbonate linkages and ester linkages. In one embodiment, the oligomeric aliphatic polyestercarbonate diol has a number average molecular weight of at least about 200 AMU. The oligomeric aliphatic polyestercarbonate diols may be prepared from a diol, a diacid, and a carbonate precursor, using techniques known in the art for the preparation of polyestercarbonates. Suitable oligomeric aliphatic polyestercarbonate diols are available, such as, for example, DESMOPHEN® VP LS 2391 (formerly sold as DESMOPHEN® C200) from Bayer.

In one embodiment, the polyol compound comprises an oligomeric aliphatic polyurethane diol. The oligomeric aliphatic polyurethane diol may have the structure

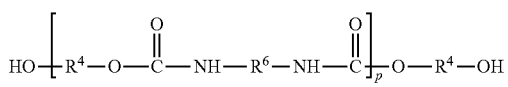

wherein $R^4$ is the residuum of a diol comprising at least 50% by number aliphatic diols in which the two hydroxyl groups are separate by at least two, preferably at least four, intervening carbon atoms; $R^6$ is the residuum of a diisocyanate compound comprising at least 50% by number aliphatic diisocyanates in which the two isocyanate groups are separate by at least two, preferably at least four, intervening carbon atoms; and p is 2 to about 20. Suitable diols are described above. Suitable aliphatic diisocyanate compounds may have the structure

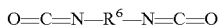

wherein $R^6$ is $C_2$-$C_{12}$ alkylene. The oligomeric aliphatic polyurethane diol may be prepared according to procedures known in the art for preparing polyurethanes. Suitable oligomeric aliphatic polyurethane diols are commercially available as, for example, K-FLEX® UD-320 from King Industries.

In one embodiment, the polyol compound comprises any of the diol compounds described above in combination with a triol compound. Suitable triol compound include, for example, the trifunctional, oligomeric polycaprolactones available as Tone 301, Tone 305 and Tone 310 from Dow, and the aliphatic polyester triol available as DESMOPHEN® F2037-420 from Bayer. The weight ratio of the diol compound to the triol compound may be about 1:99 to about 99:1, specifically about 50:50 to about 98:2, more specifically about 80:20 to about 97:3.

The curable composition may comprise about 20 to about 80 weight percent of the polyol compound, based on the total weight of the curable solids. Within this range, the polyol compound amount may specifically be at least about 30 weight percent, more specifically at least about 40 weight percent. Also within this range, the polyol compound amount may specifically be up to about 70 weight percent, more specifically up to about 60 weight percent.

In one embodiment, the curable composition comprises the aminoplast resin and the polyol compound in a weight ratio of about 40:60 to about 60:40, more specifically about 45:55 to about 55:45.

In addition to the aminoplast resin and the polyol compound, the curable composition comprises a UV-absorbing amount of a triazine compound. In one embodiment, the triazine compound may have the structure

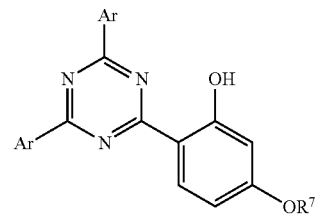

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, or $C_1$-$C_{12}$ hydrocarbylamino; and $R^7$ is hydrogen, $C_1$-$C_{16}$ hydrocarbyl wherein the hydrocarbyl group may contain nitrogen or oxygen heteroatoms, or

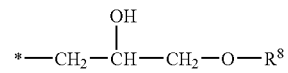

wherein $R^8$ is hydrogen or $C_1$-$C_{16}$ hydrocarbyl wherein the hydrocarbyl group may contain nitrogen or oxygen heteroatoms. Such compounds have reactive hydroxy groups that can react with the aminoplast resin. Suitable triazine compounds further include the unanchored stabilizers described in U.S. Pat. No. 5,621,052 to Szita et al., as well as those commercially available from Cytec as CYASORB® UV-1164, CYASORB® UV-1164A, and CYASORB® UV-1164L, and those available from Ciba Specialty Chemicals as TINUVIN® 400, TINUVIN® 405, and TINUVIN® 1577.

The curable composition comprises sufficient triazine compound to absorb ultraviolet light. For example, the curable composition may comprise about 0.1 to about 10 weight percent of the triazine compound, based on the total weight of the curable solids. Within this range, the triazine compound amount may specifically be at least about 1 weight percent, more specifically at least about 1.5 weight percent. Also within this range, the triazine compound amount may specifically be up to about 5 weight percent, more specifically up to about 4 weight percent.

The curable composition may, optionally, further comprise a hindered amine light stabilizer. Hindered amine light stabilizers may be 5- or 6-membered nitrogen-containing aliphatic heterocycles with tetrasubstituted carbon moieties on either side of the ring nitrogen. The nitrogen can have as its third substituent a hydrogen atom, alkyl group, alkoxy group, or the like. Examples of many hindered amine light stabilizers can be found in Plastics Additives Handbook, 5$^{th}$ Edition, H. Zweifel, ed., Hanser Publishers (2001) pp. 123-136. Hindered amine light stabilizers may include a 2,2,6,6-tetraalkylpiperidine moiety having the structure

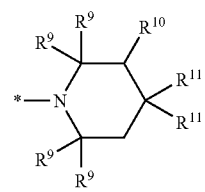

wherein each occurrence of $R^9$ is independently $C_1$-$C_6$ alkyl; $R^{10}$ is hydrogen or methyl; and each occurrence of $R^{11}$ is hydrogen, $C_1$-$C_6$ alkyl, or $C_1$-$C_6$ alkoxy. Many specific examples of hindered amine light stabilizers may be found in U.S. Pat. No. 5,714,530 to Waterman et al. In one embodiment, the conjugate acid of the hindered amine light stabilizer has a $pK_a$ less than 6.5. Suitable hindered amine light stabilizers are commercially available, for example, as TINUVIN® 123, TINUVIN® 152 (formerly sold as CGL052), TINUVIN® 622, TINUVIN® 765, and TINUVIN® 770, all from Ciba Specialty Chemicals. When present, the hindered light stabilizer may be used in an amount of about 0.01 to about 1 weight percent based on the total weight of the curable composition. Within this range, the hindered amine light stabilizer amount may specifically be at least about 0.02 weight percent, more specifically at least about 0.04 weight percent. Also within this range, the hindered amine light stabilizer amount may specifically be up to about 0.5 weight percent, more specifically up to about 0.3 weight percent.

The curable composition may, optionally, further comprise a solvent to aid in solubilizing the curable components and coating the composition. Suitable solvents include, for example, $C_1$-$C_{12}$ alcohols, $C_3$-$C_{12}$ ketones, $C_3$-$C_{12}$ esters, $C_4$-$C_{12}$ ethers, $C_3$-$C_{12}$ alkoxy alkanols, $C_1$-$C_{12}$ halogenated hydrocarbons, $C_2$-$C_{12}$ carboxylic acids, $C_6$-$C_{18}$ aromatic compounds, or the like, and mixtures thereof. Particularly suitable compounds include, for example, $C_1$-$C_{13}$ alkanols, and $C_3$-$C_{13}$ alkoxyalkanols. For example, the solvent may comprise methanol, ethanol, n-propanol, n-butanol, 1-methoxy-2-propanol, 1-butoxy-2-propanol, or the like, or mixtures thereof. In one embodiment, the solvent comprises 1-methoxy-2-propanol, 1-butoxy-2-propanol, or a mixture thereof.

The curable composition may, optionally, further comprise a curing catalyst. Suitable curing catalysts include, alkyl acid phosphates, such as monomethyl acid phosphate, monoethyl acid phosphate, monopropyl acid phosphate and monobutyl acid phosphate, as well as the corresponding dialkyl compounds, such as dibutyl acid phosphate. A mixture of mono- and dialkyl acid phosphates is often utilized. In addition to the alkyl acid phosphates, examples of other acid catalysts which can be used include phosphoric acid, maleic acid and anhydride, fumaric acid, chloromaleic acid and anhydride, alkyl acid phthalates such as methyl, ethyl, propyl and butyl acid phthalates, monoalkyl succinates and maleates such as methyl, ethyl, propyl and butyl succinates and maleates and others having sufficient solubility to permit them to be dissolved in the coating composition at the desired proportion. Catalysts which have been found to be particularly suitable are compounds such as the sulfonic acids and derivatives thereof including, for example, p-toluenesulfonic acid, methylsulfonic acid, sulfamic acid and the like, and mixtures thereof. When present, the curing catalyst may be used in an amount of about 0.1 to about 5 weight percent, based on the total weight of the curable composition.

When the curable composition comprises a curing catalyst, it may, optionally, further comprise a catalyst stabilizer. Suitable catalyst stabilizers include tertiary amines having the structure $$N(R^{12})_3$$

wherein each $R^{12}$ is independently $C_1$-$C_6$ hydrocarbyl, or two $R^{12}$ groups may combine to form a $C_2$-$C_{12}$ hydrocarbylene group. In one embodiment, the sum of carbon atoms in the three $R^{12}$ groups is about 4 to about 10, more specifically about 5 to about 8. A representative tertiary amine is triethylamine. Suitable catalyst stabilizers further include aromatic heterocyclic amines such as pyridine, aminoalkanols such as 2-methylaminoethanol, and the like. Mixtures of the foregoing catalyst stabilizers may be employed.

In addition to the components mentioned above, the curable composition may, optionally, further comprise an additive selected from flow control agents, surfactants, viscosity modifiers, antifoaming agents, and the like, and mixtures thereof.

In one embodiment, the second layer has a thickness of about 1 to about 50 micrometers after curing. Within this range, the second layer thickness may specifically be at least 2 micrometers, more specifically at least 5 micrometers. Also within this range, the second layer thickness may specifically be up to about 40 micrometers, more specifically up to about 25 micrometers.

The second layer is disposed on a surface of the first layer. In one embodiment, the second layer is disposed on at least 95%, more specifically at least 98%, still more specifically at least 99%, of the surface of the first layer. In one embodiment, a second layer is disposed on each of two surfaces of the first layer. In another embodiment, the second layer is disposed on one surface of the first layer. In this embodiment, the surface of the first layer not in contact with the second layer may be in contact with another layer (e.g., an antifog layer), the contact with the other layer being formed by coating, lamination, or the like.

One embodiment is a sheet, comprising: a first layer comprising a polycarbonate resin; and a second layer disposed on a surface of the first layer, the second layer comprising a cured product obtained on curing a curable composition comprising
  a melamine-formaldehyde resin,
  an oligomeric aliphatic polyester diol, an oligomeric aliphatic polycarbonate diol, an oligomeric aliphatic polyestercarbonate diol, an oligomeric aliphatic polyurethane diol, or a mixture thereof, and
  a UV-absorbing amount of a triazine compound having the structure

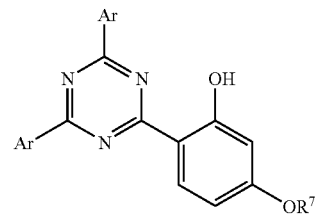

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, or hydrocarbylamino; and $R^7$ is hydrogen, $C_1$-$C_{16}$ hydrocarbyl wherein the hydrocarbyl group may contain nitrogen or oxygen heteroatoms, or

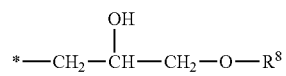

wherein $R^8$ is hydrogen or $C_1$-$C_{16}$ hydrocarbyl wherein the hydrocarbyl group may contain nitrogen or oxygen heteroatoms.

Another embodiment is a sheet, comprising: a first layer comprising a polycarbonate resin and having a thickness of about 0.1 to about 20 millimeters; and a second layer disposed on a surface of the first layer, the second layer having a thickness of about 2 to about 40 micrometers and comprising a cured product obtained on curing a curable composition comprising, based on the total weight of the curable solids,
  about 40 to about 60 weight percent melamine-formaldehyde resin,
  about 40 to about 60 weight percent of an oligomeric polyester diol, an oligomeric polycarbonate diol, an oligomeric polyestercarbonate diol, or a mixture thereof,
  about 0.1 to about 5 weight percent of p-toluenesulfonic acid, and
  about 0.1 to about 5 weight percent of a UV-absorbing amount of a triazine compound having the structure

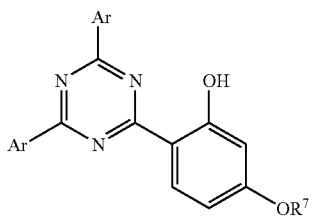

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, $C_{1\text{-}l}$ -$_{C12}$ hydrocarbylamino; and $R^7$ is hydrogen, $C_1$-$C_{16}$ hydrocarbyl wherein the hydrocarbyl group may contain nitrogen or oxygen heteroatoms, or

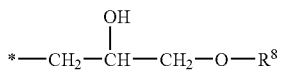

wherein $R^8$ is hydrogen or $C_1$-$C_{16}$ hydrocarbyl wherein the hydrocarbyl group may contain nitrogen or oxygen heteroatoms.

In one embodiment, the curable composition further comprises a solvent comprising 1-methoxy-2-propanol, 1-butoxy-2-propanol, or a mixture thereof. In one embodiment, the curable composition further comprises about 0.01 to about 1 weight percent of a hindered amine light stabilizer.

The curable composition may be formed by blending the aminoplast resin, the polyol compound, the triazine compound, and any optional components. The curable composition may be applied to the first layer using known means such as, for example, rolling, spraying, dipping, brushing, flow-coating, casting, and the like. The curable coating is preferably cured by heat curing. For example, it may be heated conventionally, by infrared radiation, microwave radiation, or the like. Curing may be accomplished, for example, by heating to about 100 to about 150° C. for about 15 minutes to about 4 hours. In one embodiment, the curing temperature may be about 130° C. or less to reduce or eliminate distortion of the first layer. In one embodiment, the solvent is substantially evaporated before the curing temperature is reached.

One embodiment is a method of producing a sheet, comprising: coating a curable composition on a face of a polycarbonate sheet, wherein the curable composition comprises an aminoplast resin, a polyol compound, and a UV-absorbing amount of a triazine compound; and curing the curable composition to form a protective layer.

One embodiment is an article formed from a coated polycarbonate sheet having any of the second layer compositions described above. Suitable techniques for forming articles include, for example, drape-forming, thermoforming, vacuum forming, pressure forming, compression molding, cold curving, hot line bending, lamination, in-mold decoration, printing, and the like, and combinations thereof. Articles that may be formed from the sheet include, for example, motorcycle windshields, goggles, and helmet visors.

Those skilled in the art will also appreciate that common curing and surface modification processes include, for example, heat-setting, texturing, embossing, corona treatment, flame treatment, plasma treatment and vacuum deposition may further be applied to the above articles to alter surface appearances and impart additional functionalities to the articles.

The invention is further illustrated by the following non-limiting examples.

EXAMPLES 1-35

Coating Formulations. Several curable coating compositions differing in the types of polyol compound and UV absorber were prepared containing 5.3 grams CYMEL® 303 (hexamethoxymethylmelamine; obtained from Cytec), 0.15 gram p-toluenesulfonic acid, 6.16 g 1-methoxy-2-propanol, 6.16 g. 1-butoxy-2-propanol, 0.59 gram methanol, 0.75 gram 1-butanol, 0.59 g 2-propanol, 0.05 g EFKA® 30, and 0.56 g (as solids) UV absorber. The UV absorber was therefore present at 5% based on coating solids. The polyol compound was selected from DESMOPHEN® VP LS 2391 (an aliphatic polyestercarbonate diol available from Bayer), DESMOPHEN® S1015-120 (an aliphatic polyester diol available from Bayer), and K-FLEX® UD-320 (an aliphatic polyurethane diol available from Bayer). The UV absorbers were selected from CYASORB® UV-531 (a benzophenone available from Cytec), TINUVIN® 384 (a benzotriazole available from Ciba Specialty Chemicals), TINUVIN® 400 (a triazine available from Ciba Specialty Chemicals), and 2,6-dihydroxybenzophenone (DHBP). Some samples additionally contained the hindered amine light stabilizer TINUVIN® 152, available from Ciba Specialty Chemicals.

Volatility and Migration of UV Absorbers. Samples were flow coated onto 2 inch by 6 inch (5.08 centimeter by 15.24 centimeter) unstabilized polycarbonate film with a thickness of 10 mils (250 microns). Coated layers were allowed to drain for approximately 30 minutes then placed in a 125° C. forced air oven for five minutes to fully dry the film. Initial absorbance (at the $\lambda_{max}$ of the UV absorber) was taken on a Unicam UV-3 spectrophotometer at a place where it was approximately 1.5-2.0 absorbance units, and the spot was marked. The samples were then cured for 75 minutes at 125° C. and the absorbance was remeasured. The coating was then etched off with concentrated sulfuric acid, and the absorbance was measured a third time. These measurements enabled calculation of the amount of UV absorber that volatilized, that migrated into the polycarbonate, and (by difference) the amount that remained in the coating.

Photostability measurements. Small portions (about 1 centimeter×2 centimeters) of the above films were mounted on steel frames to make arrays. Absorbance readings were obtained from each film at 325, 328, 340, and 345 nanometers using an uncoated polycarbonate film in the reference beam. The appropriate absorbance for each UV absorber (see Table 1) was plotted as $\log(10^4-1)$ vs. exposure. The exposure was expressed as kilojoules/(meter$^2$-nanometer) (kJ/m$^2$·nm) measured at 340 nanometers. The slope is the rate of UV absorber photodegradation expressed as absorbance units per 1000 kJ/m$^2$. nm at 340 nm.

The sample array was exposed in an Atlas Ci4000 xenon arc Weather-ometer according to the following conditions:
  irradiance: 0.75 Watts/meter$^2$ @ 340 nm
  light period: 100% On
  dark/dry: N/A
  dark/spray: 30 minutes weekly
  light/spray: N/A
  black panel: 55° C.
  dry bulb: 35° C.
  rel. humid.: 30%
  inner filter: CIRA
  outer filter: Soda lime.

Results, presented in Table 1, show that the triazine UV absorber TINUVIN® 400 was retained well during cure and had a generally low loss rate in coatings made with all three diols. The benzotriazole TINUVIN® 384 was retained less well during cure and had a much high loss rate. The benzophenone DHBP was retained well during cure, but was lost quickly during weathering while the benzophenone CYASORB® 531 was not retained well during cure and was lost very rapidly during weathering. The hindered amine light stabilizer had little effect on the UV absorber losses.

TABLE 1

| Ex. No. | diol | UVA | HALS | % UVA in coating post cure | loss rate A/1000 kJ |
|---|---|---|---|---|---|
| 1 | Desmophen VP LS 2391 | Tinuvin 400 | | 100 | 0.06 |
| 2 | Desmophen VP LS 2391 | Tinuvin 400 | 0.06 | 98 | 0.05 |
| 3 | Desmophen VP LS 2391 | Tinuvin 400 | 0.06 | 98 | 0.04 |
| 4 | Desmophen S1015-120 | Tinuvin 400 | | 99 | 0.04 |
| 5 | Desmophen S1015-120 | Tinuvin 400 | 0.06 | 99 | 0.06 |
| 6 | K-Flex UD-320 | Tinuvin 400 | | 98 | 0.06 |
| 7 | K-Flex UD-320 | Tinuvin 400 | 0.06 | 99 | 0.06 |
| 8 | K-Flex UD-320 | Tinuvin 400 | 0.06 | 100 | 0.06 |
| | | | | mean loss rate | 0.05 |
| 9 | Desmophen VP LS 2391 | Tinuvin 384 | | 78 | 0.22 |
| 10 | Desmophen VP LS 2391 | Tinuvin 384 | 0.06 | 81 | 0.19 |
| 11 | Desmophen S1015-120 | Tinuvin 384 | | 75 | 0.25 |
| 12 | Desmophen S1015-120 | Tinuvin 384 | | 75 | 0.22 |
| 13 | Desmophen S1015-120 | Tinuvin 384 | | 78 | 0.19 |
| 14 | Desmophen S1015-120 | Tinuvin 384 | 0.06 | 82 | 0.19 |
| 15 | Desmophen S1015-120 | Tinuvin 384 | 0.06 | 78 | 0.17 |
| 16 | K-Flex UD-320 | Tinuvin 384 | | 89 | 0.17 |
| 17 | K-Flex UD-320 | Tinuvin 384 | 0.06 | 86 | 0.17 |
| | | | | mean loss rate | 0.19 |
| 18 | Desmophen VP LS 2391 | DHBP | | 98 | 0.51 |
| 19 | Desmophen VP LS 2391 | DHBP | | 99 | 0.57 |
| 20 | Desmophen S1015-120 | DHBP | | 100 | 0.43 |
| 21 | Desmophen S1015-120 | DHBP | | 98 | 0.39 |
| 22 | Desmophen S1015-120 | DHBP | 0.06 | 98 | 0.30 |
| 23 | K-Flex UD-320 | DHBP | | 99 | 0.42 |
| 24 | K-Flex UD-320 | DHBP | | 99 | 0.40 |
| 25 | K-Flex UD-320 | DHBP | 0.06 | 98 | 0.43 |
| | | | | mean loss rate | 0.45 |
| 26 | Desmophen VP LS 2391 | Cyasorb 531 | | 37 | 0.71 |
| 27 | Desmophen VP LS 2391 | Cyasorb 531 | | 42 | 1.00 |
| 28 | Desmophen VP LS 2391 | Cyasorb 531 | 0.06 | 47 | 0.70 |

TABLE 1-continued

| Ex. No. | diol | UVA | HALS | % UVA in coating post cure | loss rate A/1000 kJ |
|---|---|---|---|---|---|
| 29 | Desmophen VP LS 2391 | Cyasorb 531 | 0.06 | 33 | 0.68 |
| 30 | Desmophen S1015-120 | Cyasorb 531 | | 43 | 0.61 |
| 31 | Desmophen S1015-120 | Cyasorb 531 | 0.06 | 40 | 0.72 |
| 32 | Desmophen S1015-120 | Cyasorb 531 | 0.06 | 40 | 0.82 |
| 33 | K-Flex UD-320 | Cyasorb 531 | | 73 | 0.68 |
| 34 | K-Flex UD-320 | Cyasorb 531 | 0.06 | 70 | 0.67 |
| 35 | K-Flex UD-320 | Cyasorb 531 | 0.06 | 68 | 0.86 |
| | | | | mean loss rate | 0.75 |

EXAMPLES 36 and 37

Example 2 from Table 1 was reformulated to contain only 2.2% TINUVIN® 400 by weight of coating solids to make Example 36. Example 36 and Example 37, containing 5% CYASORB® 531, were flow coated onto 4 inch by 12 inch by ⅛ inch (10.16 cm by 30.48 by 0.3175 cm) polycarbonate panels, air dried for 30 minutes, and baked for 60 minutes at 130° C. in a forced air oven. Samples from 3" below the flow line of the panel (the flow line is the vertical position at which the coating is applied) were subjected to xenon arc weathering in an Atlas Ci35a xenon arc weatherometer under the conditions shown below:

irradiance: 0.77 Watts/meter$^2$ @ 340 nanometers
light period: 160 minutes
dark/dry: 5 minutes
dark/spray: 15 minutes
light/spray: N/A
black panel: 70° C.
dry bulb: 45° C.
relative humidity: 50%
inner filter: Type S borosilicate
outer filter: Type S borosilicate After an exposure of 6950 kJ/m$^2$nm measured at 340 nm, the Example 36 sample with triazine UV absorber had a change in Yellowness Index (ASTM D1925) of −0.14 while the Example 37 sample, made with the benzophenone UV absorber, had a change in Yellowness Index of +8.3 and suffered delamination.

This example shows superior weatherability of the coating containing the triazine UV absorber, even when present in half the loading of a benzophenone UV absorber.

EXAMPLES 38-42

Examples 38-42 were made by flow coating 4.5 millimeter thick flat polycarbonate panels with the coating compositions shown in Table 2, below, letting the coated panels air dry for 20 minutes, and curing them for 60 minutes at 130° C. The samples varied primarily in the type and amount of polyol compound, the amount of p-toluenesulfonic acid, the amount of triethylamine, the solvent composition, and the amounts of triazine and hindered amine light stabilizers. Most raw materials were the same as those used in Examples 1-35. Tone 210 is an aliphatic oligomeric diol supplied by Dow. PTSA is p-toluenesulfonic acid. All amounts are expressed in parts by weight.

TABLE 2

| | Ex. 38 | Ex. 39 | Ex. 40 | Ex. 41 | Ex. 42 |
|---|---|---|---|---|---|
| Cymel 303 | 32.90 | 32.90 | 32.90 | 32.90 | 32.80 |
| Desmophen VP LS 2391 | 32.90 | 32.90 | 32.90 | 32.90 | 0.00 |
| Tone 210 | 0.00 | 0.00 | 0.00 | 0.00 | 24.00 |
| PTSA (20% soln in methoxypropanol) | 8.88 | 8.88 | 2.22 | 2.22 | 2.49 |
| Triethylamine | 0.00 | 0.95 | 0.00 | 0.24 | 0.00 |
| 1-Methoxy-2-propanol | 37.01 | 37.01 | 37.01 | 37.01 | 90.00 |
| 1-Butoxy-2-propanol | 37.01 | 37.01 | 37.01 | 37.01 | 0.00 |
| n-Butanol | 4.48 | 4.48 | 4.48 | 4.48 | 0.00 |
| Methanol | 3.52 | 3.52 | 3.52 | 3.52 | 0.00 |
| Efka 30 | 0.27 | 0.27 | 0.27 | 0.27 | 0.29 |
| Tinuvin 400 | 1.74 | 1.74 | 1.74 | 1.74 | 2.82 |
| Tinuvin 152 | 0.19 | 0.19 | 0.19 | 0.19 | 0.30 |

All panels were subjected to the Taber abrasion test (ASTM D1044 at 100 cycles, 500 gram load, CS10F wheels). Haze was measured according to ASTM D1003 prior to the test and after the test. The test was done on 3 panels and the average haze increase is reported in the Table 3. The results show that all samples meet the initial abrasion resistance requirements of ANSI/SAE Z26.1-1996 Item 4 for safety glazing materials.

TABLE 3

|  | Ex. 38 | Ex. 39 | Ex. 40 | Ex. 41 | Ex. 42 |
| --- | --- | --- | --- | --- | --- |
| Delta Haze [%] | 5.8 | 4.2 | 5.5 | 3.3 | 9.1 |

For the formability test, all panels were pre-heated in an oven at 160° C. and molded over a 4 inch diameter mandrel. Samples 38, 39, 40 and 41 showed no cracking whereas sample 42 showed two small edge cracks after molding.

Examples 43-45

EXAMPLES 43-45 were prepared by flow coating 5 millimeter thick by 600 millimeter wide by 2000 millimeter high flat polycarbonate panels with the coating compositions shown in Table 4, below, letting the coated panels air dry for 20 min and curing them for 60 min at 130° C. CYMEL® 301 is hexamethoxymethylmelamine, a product of Cytec.

TABLE 4

|  | Ex. 43 | Ex. 44 | Ex. 45 |
| --- | --- | --- | --- |
| Cymel 301 | 0.00 | 0.00 | 13.53 |
| Cymel 303 | 15.54 | 15.50 | 0.00 |
| Desmophen S-1015-120 | 0.00 | 0.00 | 10.14 |
| Desmophen VP LS 2391 | 15.54 | 15.50 | 0.00 |
| PTSA (20% in methoxypropanol) | 1.52 | 1.51 | 0.36 |
| Triethylamine | 0.00 | 0.25 | 0.00 |
| Tinuvin 400 | 0.87 | 0.87 | 0.00 |
| Tinuvin 123 | 0.08 | 0.08 | 0.00 |
| Efka 30 | 0.13 | 0.13 | 0.18 |
| DHBP | 0.00 | 0.00 | 1.35 |
| 1,2-butanediol | 0.00 | 0.00 | 8.68 |
| 1-Methoxy-2-propanol | 45.79 | 45.67 | 47.74 |
| 1-Butoxy-2-propanol | 16.88 | 16.84 | 18.02 |
| n-Butanol | 2.05 | 2.04 | 0.00 |
| Methanol | 1.62 | 1.61 | 0.00 |

All panels were subjected to the Taber abrasion test (ASTM D1044 at 100 cycles, 500 gram load, CS10F wheels). Haze increase is reported in the Table 5.

In Table 5, "Delta Haze Top" refers to measurements on samples approximately 2-12 centimeters below the flow line, and "Delta Haze Bottom" refers to measurements on samples approximately 2-12 centimeters above the bottom of the sheet. The results show that all samples meet the initial abrasion resistance requirements of ANSI/SAE Z26.1-1996 Item 4 for safety glazing materials.

Formability was measured by heating 12 sheets, 100 millimeters by 300 millimeters in size, in an oven at 160° C. and molding them over mandrels of 100 millimeter and 150 millimeter radii. Even the slightest cracking of the coating was considered a failure. In Table 5, the percentage of sheets that passed the formability test is reported. The results show that Examples 43 and 44 had superior formability while maintaining or improving abrasion resistance compared with Example 45.

TABLE 5

|  | Ex. 43 | Ex. 44 | Ex. 45 |
| --- | --- | --- | --- |
| Delta Haze Top [%] | 8.9 | 6 | 9.6 |
| Delta Haze Bottom [%] | 7.8 | 4.8 | 8.3 |
| Formability @ 100 mm [%] | 75 | 58 | 0 |
| Formability @ 150 mm [%] | 100 | 100 | 75 |

EXAMPLES 46-54

Coating solutions with the formulations shown in Table 6 were prepared (all amounts are expressed in parts by weight). Tone 301, Tone 305 and Tone 310 are trifunctional, oligomeric polycaprolactones obtained from Dow. DESMOPHEN® F2037-420 is an aliphatic polyester triol from Bayer. Polycarbonate sheet was coated by dipping it in the coating solution, letting it air dry for 20 minutes at room temperature, and curing it at 130° C. for 60 minutes.

TABLE 6

| Component | Ex. 46 | Ex. 47 | Ex. 48 | Ex. 49 | Ex. 50 | Ex. 51 | Ex. 52 | Ex. 53 | Ex. 54 |
| --- | --- | --- | --- | --- | --- | --- | --- | --- | --- |
| Cymel 303 | 25.78 | 25.78 | 25.78 | 25.78 | 25.78 | 25.78 | 25.78 | 25.78 | 25.78 |
| Desmophen VP LS 2391 | 25.70 | 19.30 | 19.30 | 19.30 | 19.30 | 21.80 | 21.80 | 21.80 | 21.80 |
| Desmophen F2037-420 | 0.00 | 6.40 | 0.00 | 0.00 | 0.00 | 3.90 | 0.00 | 0.00 | 0.00 |
| Tone 301 | 0.00 | 0.00 | 6.40 | 0.00 | 0.00 | 0.00 | 3.90 | 0.00 | 0.00 |
| Tone 305 | 0.00 | 0.00 | 0.00 | 6.40 | 0.00 | 0.00 | 0.00 | 3.90 | 0.00 |
| Tone 310 | 0.00 | 0.00 | 0.00 | 0.00 | 6.40 | 0.00 | 0.00 | 0.00 | 3.90 |
| 20% p-toluenesulfonic acid in 2-propanol | 4.38 | 4.38 | 4.38 | 4.38 | 4.38 | 4.38 | 4.38 | 4.38 | 4.38 |
| Efka 30 | 0.11 | 0.11 | 0.11 | 0.11 | 0.11 | 0.11 | 0.11 | 0.11 | 0.11 |
| Tinuvin 400 | 1.37 | 1.37 | 1.37 | 1.37 | 1.37 | 1.37 | 1.37 | 1.37 | 1.37 |
| Tinuvin 152 | 0.15 | 0.15 | 0.15 | 0.15 | 0.15 | 0.15 | 0.15 | 0.15 | 0.15 |
| 1-methoxy-2-propanol | 29.00 | 29.00 | 29.00 | 29.00 | 29.00 | 29.00 | 29.00 | 29.00 | 29.00 |
| 1-butoxy-2-propanol | 29.00 | 29.00 | 29.00 | 29.00 | 29.00 | 29.00 | 29.00 | 29.00 | 29.00 |
| 1-butanol | 6.45 | 6.45 | 6.45 | 6.45 | 6.45 | 6.45 | 6.45 | 6.45 | 6.45 |

Chemical resistance of the coated sheets was analyzed by application of an acetone drenched cloth and visual analysis after removal of the cloth. The analysis was done after 2, 3, 4, and 5 min application respectively. The results are reported as "P" when no visual change of the coating was observed, "JS" when the coating was just starting to wrinkle and "F" when the coating was obviously damaged. The results are shown in Table 7.

TABLE 7

| Acetone resistance | Ex. 46 | Ex. 47 | Ex. 48 | Ex. 49 | Ex. 50 | Ex. 51 | Ex. 52 | Ex. 53 | Ex. 54 |
|---|---|---|---|---|---|---|---|---|---|
| 2 min | P | P | P | P | P | P | P | P | P |
| 3 min | P | P | P | P | P | P | P | P | P |
| 4 min | JS | P | P | P | P | P | P | P | P |
| 5 min | JS | P | P | P | JS | F | P | JS | JS |

From these examples it is clear that addition of trifunctional oligomers increases the chemical resistance of the coating towards acetone compared with Example 46.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context.

The invention claimed is:

1. A sheet, comprising:
a first layer comprising a polycarbonate resin; and
a second layer disposed on a surface of the first layer, the second layer comprising a cured product obtained on curing a curable composition consisting of
an aminoplast resin,
a polyol compound comprising an oligomeric aliphatic polyestercarbonate diol,
a UV-absorbing amount of a triazine compound, and
optionally, one or more of
a solvent selected from $C_1$-$C_{12}$ alcohols, $C_3$-$C_{12}$ ketones, $C_3$-$C_{12}$ esters, $C_4$-$C_{12}$ ethers, $C_3$-$C_{12}$ alkoxy alkanols, $C_1$-$C_{12}$ halogenated hydrocarbons, $C_2$-$C_{12}$ carboxylic acids, $C_6$-$C_{18}$ aromatic compounds, and mixtures thereof,
a hindered amine light stabilizer,
a curing catalyst selected from alkyl acid phosphates, dialkyl acid phosphates, phosphoric acid, maleic acid, maleic anhydride, fumaric acid, chloromaleic acid, chloromaleic anhydride, alkyl acid phthalates, monoalkyl succinates, monoalkyl maleates, alkyl sulfonic acids, aryl sulfonic acids, sulfamic acid, and mixtures thereof,
a catalyst stabilizer, and
an additive selected from flow control agents, surfactants, viscosity modifiers, antifoaming agents, and mixtures thereof;
wherein the triazine compound has the structure

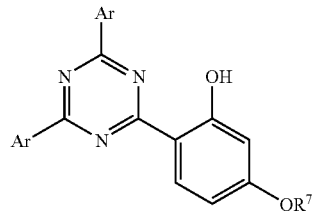

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, or $C_1$-$C_{12}$ hydrocarbylamino; and $R^7$ is hydrogen, $C_1$-$C_{16}$ hydrocarbyl wherein the hydrocarbyl group may contain nitrogen or oxygen heteroatoms, or

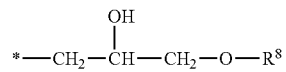

wherein $R^8$ is hydrogen or $C_1$-$C_{16}$ hydrocarbyl wherein the hydrocarbyl group may contain nitrogen or oxygen heteroatoms.

2. The sheet of claim 1, wherein the first layer further comprises a thermoplastic resin selected from poly(butylene terephthalate), poly(ethylene terephthalate), aliphatic polyesters, poly(styrene-co-acrylonitrile), and rubber-containing impact modifiers.

3. The sheet of claim 1, wherein the first layer is substantially free of colorant.

4. The sheet of claim 1, wherein the first layer has a thickness of about 0.05 to about 25 millimeters.

5. The sheet of claim 1, wherein the aminoplast resin is a melamine-formaldehyde resin having the structure

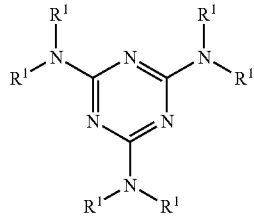

wherein each occurrence of $R^1$ is independently hydrogen, a methylene bridge to another melamine nucleus, or $CH_2OR^2$, wherein $R^2$ is hydrogen or $C_1$-$C_{12}$ alkyl.

6. The sheet of claim 1, wherein the curable composition comprises about 20 to about 80 weight percent of the aminoplast resin, based on the total weight of curable solids.

7. The sheet of claim 1, wherein the polyol compound has a number average molecular weight greater than 200 atomic mass units.

8. The sheet of claim 1, wherein the curable composition comprises about 20 to about 80 weight percent of the polyol, based on the total weight of curable solids.

9. The sheet of claim 1, wherein the curable composition comprises about 0.1 to about 10 of the triazine, based on the total weight of curable solids.

10. The sheet of claim 1, wherein the curable composition includes the hindered amine light stabilizer.

11. The sheet of claim 1, wherein the curable composition includes the solvent.

12. The sheet of claim 11, wherein the solvent is 1-methoxy-2-propanol, 1-butoxy-2-propanol, or a mixture thereof.

13. The sheet of claim 1, wherein the curable composition includes the curing catalyst.

14. The sheet of claim 13, wherein the curable composition includes the catalyst stabilizer.

15. The sheet of claim 14, wherein the catalyst stabilizer is selected from triethylamine, pyridine, 2-methylaminoethanol, and mixtures thereof 16. The sheet of claim 1, wherein the curable composition comprises the additive.

17. The sheet of claim 1, wherein the second layer has a thickness of about 1 to about 50 micrometers.

18. An article formed from the sheet of claim 1.

19. The article of claim 18, wherein forming the article comprises drape-forming, thermoforming, vacuum forming, pressure forming, compression molding, cold curving, hot line bending, lamination, in-mold decoration, printing, or a combination thereof.

20. A sheet, comprising:
a first layer comprising a polycarbonate resin; and
a second layer disposed on a surface of the first layer, the second layer comprising a cured product obtained on curing a curable composition consisting of
a melamine-formaldehyde resin,
an oligomeric aliphatic polyestercarbonate diol,
a UV-absorbing amount of a triazine compound having the structure

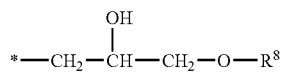

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, or $C_1$-$C_{12}$ hydrocarbylamino; and $R^7$ is hydrogen, $C_1$-$C_{16}$ hydrocarbyl wherein the hydrocarbyl group may contain nitrogen or oxygen heteroatoms, or

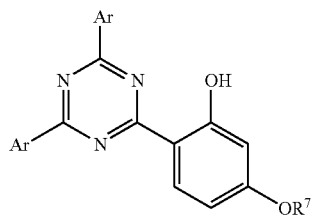

wherein $R^8$ is hydrogen or $C_1$-$C_{16}$ hydrocarbyl wherein the hydrocarbyl group may contain nitrogen or oxygen heteroatoms, and
optionally, one or more of
a solvent selected from $C_1$-$C_{12}$ alcohols, $C_3$-$C_{12}$ ketones, $C_3$-$C_{12}$ esters, $C_4$-$C_{12}$ ethers, $C_3$-$C_{12}$ alkoxy alkanols, $C_1$-$C_{12}$ halogenated hydrocarbons, $C_2$-$C_{12}$ carboxylic acids, $C_6$-$C_{18}$ aromatic compounds, and mixtures thereof,
a hindered amine light stabilizer,
a curing catalyst selected from alkyl acid phosphates, dialkyl acid phosphates, phosphoric acid, maleic acid, maleic anhydride, fumaric acid, chloromaleic acid, chloromaleic anhydride, alkyl acid phthalates, monoalkyl succinates, monoalkyl maleates, alkyl sulfonic acids, aryl sulfonic acids, sulfamic acid, and mixtures thereof,
a catalyst stabilizer, and
an additive selected from flow control agents, surfactants, viscosity modifiers, antifoaming agents, and mixtures thereof.

21. A sheet, comprising:
a first layer comprising a polycarbonate resin and having a thickness of about 0.1 to about 20 millimeters; and
a second layer disposed on a surface of the first layer, the second layer having a thickness of about 2 to about 40 micrometers and comprising a cured product obtained on curing a curable composition consisting of, based on the total weight of the curable solids,
about 40 to about 60 weight percent melamine-formaldehyde resin,
about 40 to about 60 weight percent of an oligomeric aliphatic polyestercarbonate diol,
about 0.1 to about 5 weight percent of p-toluenesulfonic acid,
about 0.1 to about 5 weight percent of a UV-absorbing amount of a triazine compound having the structure

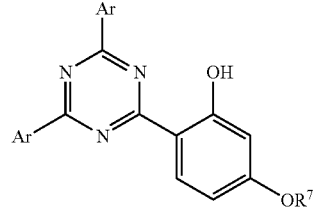

wherein each occurrence of Ar is independently phenyl or substituted phenyl; wherein the substituents on the phenyl group may be hydroxy, amino, $C_1$-$C_{12}$ hydrocarbyl, $C_1$-$C_{12}$ hydrocarbyloxy, or $C_1$-$C_{12}$ hydrocarbylamino; and $R^7$ is hydrogen, $C_1$-$C_{16}$ hydrocarbyl wherein the hydrocarbyl group may contain nitrogen or oxygen heteroatoms, or

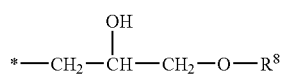

wherein $R^8$ is hydrogen or $C_1$-$C_{16}$ hydrocarbyl wherein the hydrocarbyl group may contain nitrogen or oxygen heteroatoms, and optionally, one or more of a solvent selected from $C_1$-$C_{12}$ alcohols, $C_3$-$C_{12}$ ketones, $C_3$-$C_{12}$ esters, $C_4$-$C_{12}$ ethers, $C_3$-$C_{12}$ alkoxy alkanols, $C_1$-$C_{12}$ halogenated hydrocarbons, $C_2$-$C_{12}$ carboxylic acids, $C_6$-$C_{18}$ aromatic compounds, and mixtures thereof, a hindered amine light stabilizer, a catalyst stabilizer, and an additive selected from flow control agents, surfactants, viscosity modifiers, antifoaming agents, and mixtures thereof.

22. The sheet of claim 21, wherein the curable composition includes the solvent, and wherein the solvent is 1-methoxy-2-propanol, 1-butoxy-2-propanol, or a mixture thereof.

23. The sheet of claim 21, wherein the curable composition includes the hindered amine light stabilizer in an amount of about 0.01 to about 1 weight percent.

24. An article formed from the sheet of claim 20.

25. An article formed from the sheet of claim 21.

* * * * *